No. 657,260. Patented Sept. 4, 1900.
H. WILCKE
SELF PROPELLED VEHICLE.
(Application filed Apr. 30, 1900.)
(No Model.) 2 Sheets—Sheet 1.
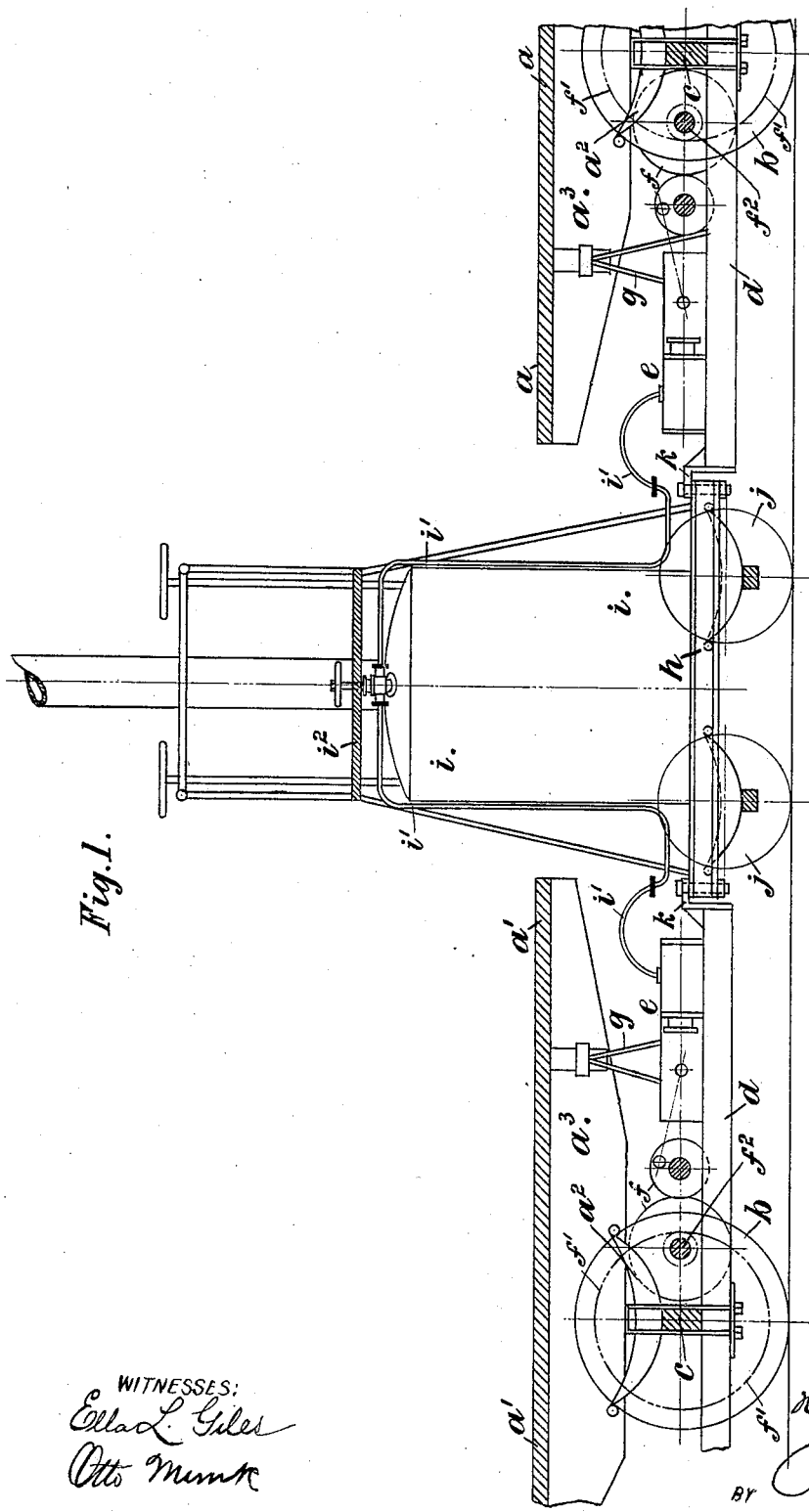

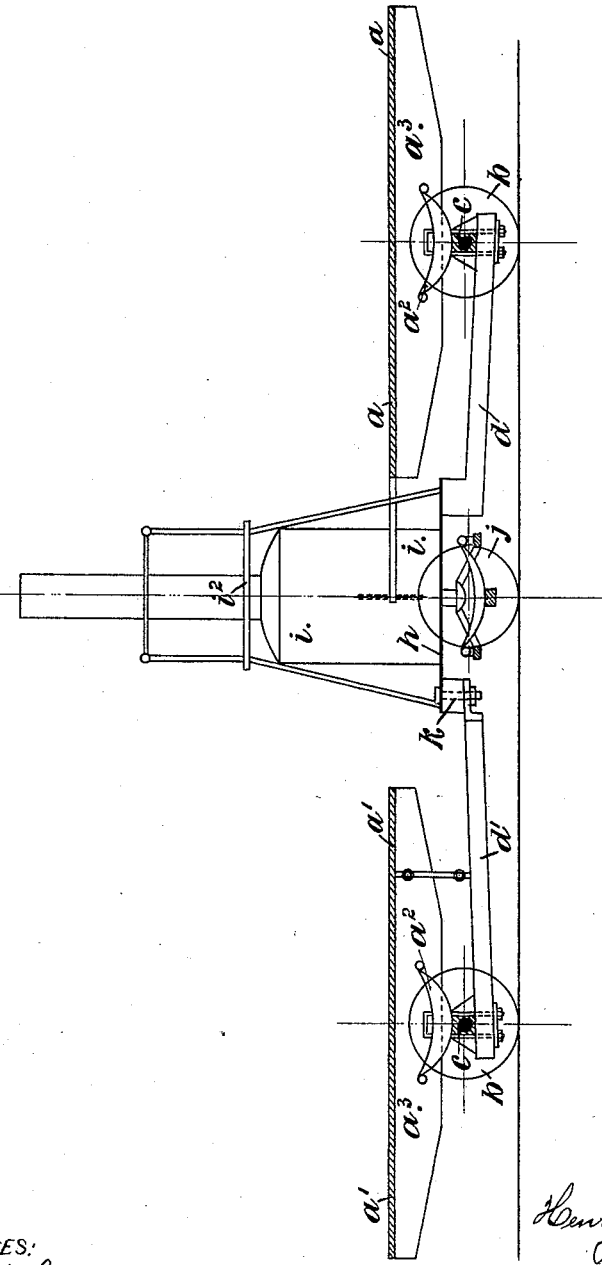

UNITED STATES PATENT OFFICE.

HENRY WILCKE, OF LIVERPOOL, ENGLAND.

SELF-PROPELLED VEHICLE.

SPECIFICATION forming part of Letters Patent No. 657,260, dated September 4, 1900.

Application filed April 30, 1900. Serial No. 14,977. (No model.)

*To all whom it may concern:*

Be it known that I, HENRY WILCKE, a subject of the Queen of England, and a resident of Tuebrook, Liverpool, in the county of Lancaster, England, have invented certain new and useful Improvements in or Connected with Self-Propelled Vehicles, of which the following is a specification.

This invention has reference more particularly to self-propelled vehicles for use on common roads, and more especially to such of this class of vehicles which carry loads of considerable weight—that is to say, other than mere light vehicles. It has, however, also reference to self-propelled vehicles for carrying heavy passenger traffic on common roads and also street or road railways and the like.

For convenience the invention will be first described as applied to the hauling or carrying of goods on common roads. According to this invention as applied to this purpose the object has been mainly to provide a means of transport by which heavy loads of goods can be sent comparatively-long distances with economy and also to provide such an arrangement and construction of rolling-stock or apparatus which can be maneuvered and worked with ease and precision.

The invention will be described with the aid of the accompanying drawings.

In the drawings, Figure 1 is a side elevation showing rolling-stock according to the invention, and Fig. 2 is a side elevation showing a modified construction of same.

The rolling-stock consists of a vehicle having two platforms $a\ a'$, one at each end, each of which is mounted or supported from the road by a single pair of road-wheels $b$ in the center longitudinally of such platform, and in connection with the axles or axletrees $c$ of the wheels $b$ there is provided a separate and lower frame $d$ under the inner half of the two platforms. On these frames $d$ the motor machinery is mounted and carried, and this machinery consists of a steam-engine $e$ and toothed gearing $f$ of any suitable known kind driven from the engine $e$ and meshing with a toothed circular rack $f'$ on each of the road-wheels $b$. The wheels of the gearing, which mesh with and drive the road-wheel racks $f'$, are mounted on a secondary shaft $f^2$, supported in bearings fixed on the under frame $d$. The platforms $a\ a'$ are steadied from the frame $d$ by bars $g$, coupling them together so that the platforms are prevented from tipping up in either direction, and this coupling may be provided with more or less play or through a spring to provide non-rigid or elastic connection. The connection between the axles $c$ and the carriage-platforms is through springs $a^2$, the centers of which are connected rigidly with the axles and their ends with the beams $a^3$ of the platforms. Between the two platforms $a\ a'$ and their respective lower frames $d$, constituting together two carriages, there is a third carriage $h$, carrying the steam-generator $i$ for supplying the two steam-engines $e$ with steam, $i'$ being the steam-supply pipes. The carriage or platform $h$ is mounted on two pairs of wheels $j$, each of which pairs is adapted to be moved out of the vertical longitudinal plane of the carriages for steering, this being effected in any of the well-known ways common in motor-vehicles or traction-engines. Only one pair of these wheels may be moved at a time or both pairs may be moved, and as these wheels are moved in one direction or the other the vehicles will all turn or maneuver one way or the other. This steering is effected, preferably, from an upper platform $i^2$, above the steam-generator $i$. To the vehicles $h$ the two frames $d$ are connected by a loose joint or hinge $k$, and about these hinges the three vehicles can move in relation to each other. This hinge serves as a coupling and also as a means of preventing the frames $d$ from moving up and down at this end, and the three parts $d\ d\ h$ constitute an articulated frame. The joints or hinges $k$ are in some cases provided with a slot, or one of them is, in order to avoid the whole load coming on the motors at once, and so facilitate starting. By this construction of rolling-stock the whole of the load placed on the carrying-platforms $a\ a'$ come upon their respective driving road-wheels $b$, and consequently the tractive or driving wheels are pressed onto the surface of the road, which constitutes the tractive or reactive surface, exactly in proportion to the weight of the load, so that slipping of the driving or tractive wheels is avoided, while the steering-wheels $j$ are relieved from the load and are pressed on only by the weight of the boiler $i$ upon them. Then as regards the propelling machinery it is bedded firmly on the under frames $d$, and the axles $c$ being also fixed on these frames rigidity between the machinery and the driving-wheels $b$ is provided and a true and smooth running gearing with little friction is afforded.

In the modification shown in Fig. 2 the part $h$, on which the boiler $i'$ is mounted, is rigidly connected with or forms part of one of the under frames $d$, and only one pair of supporting-wheels $j$ are employed to support it from the road. This pair of wheels are the steering-wheels of the carriage and are moved in any suitable known way, as above described.

The couplings or hinges $k$ are preferably made in the form of a joint of any known suitable kind, so that the frame $d'$ and the carriage-platform $h$ may move independently or in relation to each other in the horizontal plane, and so avoid any straining of these parts on this plane due to unevennesses in the road-surface over which they are traveling.

In lieu of steam being the motive power employed compressed air or electricity may be used, in which latter case storage-cells would be used on the platform $h$, while the electric motor would be fixed in the under frames $d$ and operate on the driving-wheels $b$ similarly as the engines $e$ or in any known suitable way.

In the case of the rolling-stock or vehicles being for carrying passengers instead of goods the car-bodies would be mounted on the platforms $a$ $a'$ or beams $a^3$; but otherwise the construction will be substantially the same as that above described.

What is claimed in respect of the herein-described invention is—

1. In self-propelled rolling-stock or vehicles for use on common roads, the combination of two platforms or frames for carrying the load, each supported by a single pair of wheels, one pair being the propelling-wheels, and adapted to receive and carry the whole load, and a platform or frame between said two load platforms or frames, and supported by wheels constituting the steering-wheels of the rolling-stock or vehicles; substantially as set forth.

2. In self-propelled rolling-stock or vehicles for use on common roads, the combination of two platforms or frames for carrying the load, each supported by a single pair of wheels at the center, being the propelling-wheels, and adapted to receive and carry the whole load; a frame below each of said platforms or frames rigidly fixed to the axle, and carrying the motor machinery, the said machinery being geared directly to said driving-wheels, and a platform or frame between said two lower machinery-supporting frames supported by wheels constituting the steering-wheels of the rolling-stock or vehicles, and a loose hinge or joint connecting said latter frame, and a machinery-supporting platform or frame; substantially as set forth.

3. In self-propelled rolling-stock or vehicles for use on common roads, the combination of two load-platforms $a$ $a'$; a single axle $c$, and driving-wheels $b$ disposed under the center of said platforms; a lower platform $d$ under each platform connected with the axle $c$; driving-motor machinery $e$ fixed on the under platforms $d$; an intermediate platform $h$ provided with and supported upon the steering-wheels $j$; and a loose joint or hinge $k$ coupling said frame $h$ with a platform $d$; substantially as set forth.

4. In self-propelled rolling-stock or vehicles for use on common roads, the combination of two load-platforms $a$ $a'$; a single axle $c$, and driving-wheels $b$ disposed under the center of said platforms; a lower platform $d$ under each platform rigidly connected with the axle $c$; driving-motor machinery $e$ fixed on the under platform $d$; a support $g$ with play in it, between the platform $a$ and frame $d$ for preventing the load-platform from tilting down or up; and an intermediate platform $h$ carrying the generator $i$, provided with and supported upon the steering-wheels $j$; substantially as set forth.

5. In self-propelled rolling-stock or vehicles for use on common roads, the combination of a platform for carrying the load, supported by a single pair of wheels at or near the center, being the propelling-wheels, and adapted to receive and carry the whole load; a frame below said platform rigidly fixed to the axle, and carrying the motor machinery, and a front extended portion of the lower frame supported by wheels, constituting the steering-wheels, and carrying the generator; substantially as set forth.

In witness whereof I have hereunto set my hand in presence of two witnesses.

HENRY WILCKE.

Witnesses:
JOHN HENDLEY WALKER,
FRANK E. FLEETWOOD.